(12) United States Patent
Thompson et al.

(10) Patent No.: US 8,538,928 B2
(45) Date of Patent: *Sep. 17, 2013

(54) FLASH-COPYING WITH ASYNCHRONOUS MIRRORING ENVIRONMENT

(75) Inventors: John G. Thompson, Tucson, AZ (US); Beth A. Peterson, Tucson, AZ (US); David M. Shackelford, Tucson, AZ (US); Alfred E. Sanchez, Tucson, AZ (US); Warren K. Stanley, Loveland, CO (US); Lisa J. Gundy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,847

(22) Filed: May 1, 2012

(65) Prior Publication Data
US 2012/0216000 A1 Aug. 23, 2012

Related U.S. Application Data

(63) Continuation of application No. 12/968,167, filed on Dec. 14, 2010, now Pat. No. 8,335,766.

(51) Int. Cl.
*G06F 17/30* (2006.01)
*G06F 7/00* (2006.01)

(52) U.S. Cl.
USPC .......................................................... 707/658

(58) Field of Classification Search
USPC .......................................................... 707/658
See application file for complete search history.

(56) References Cited

U.S. PATENT DOCUMENTS

| 7,721,063 | B2 | 5/2010 | Ontko | |
|---|---|---|---|---|
| 2005/0071586 | A1* | 3/2005 | Bartfai et al. | 711/162 |
| 2005/0268054 | A1* | 12/2005 | Werner et al. | 711/162 |
| 2007/0233979 | A1* | 10/2007 | Beardsley et al. | 711/162 |
| 2012/0079224 | A1* | 3/2012 | Clayton et al. | 711/162 |

* cited by examiner

*Primary Examiner* — Kuen Lu
(74) *Attorney, Agent, or Firm* — Feb R. Cabrasawan (57) ABSTRACT

A first command is sent from a primary host system to a primary storage controller device, specifying that a first primary volume is to be flash-copied to a second primary volume. Flash-copying provides for completion of copying the first primary volume to the second primary volume to be signaled prior to data on the first primary volume being physically copied to the second primary volume. A first state of the first primary volume and the second primary volume is verified by the primary storage controller device to determine whether the first state permits flash-copying of the first primary volume to the second primary volume. A first query is sent from the primary storage controller device to a secondary host system, requesting whether a first secondary volume can be flash-copied to a second secondary volume. The first and second secondary volumes asynchronously mirror the first and second primary volumes, respectively.

10 Claims, 4 Drawing Sheets

FLASH-COPYING WITH ASYNCHRONOUS MIRRORING ENVIRONMENT

BACKGROUND

Mirroring is a form of data backup. In mirroring, data written to a primary storage volume is also written to a secondary storage volume. The volumes may be logical storage volumes of the same or different storage devices, like hard disk drives. In synchronous mirroring, data written to the primary storage volume is simultaneously written to the secondary storage volume. The data is not considered as having been written to the primary storage volume unless it also has been written to the secondary storage volume.

By comparison, in asynchronous mirroring, data written to the secondary storage volume is written at some point in time after the data has been written to the primary storage volume. The data is considered as having been written to the primary storage volume even before it has been written to the secondary storage volume. Asynchronous mirroring permits the secondary storage volume to be located at a significant distance away from the primary storage volume, without incurring the performance penalty that results with synchronous mirroring where the volumes are located at a significant distance away from each other.

SUMMARY OF THE INVENTION

A method of an embodiment of the invention includes sending a first command from a primary host system to a primary storage controller device. The first command specifies that a first primary volume is to be flash-copied to a second primary volume. Flash-copying provides for completion of copying the first primary volume to the second primary volume to be signaled prior to data on the first primary volume being physically copied to the second primary volume.

The method includes, in response to receiving the first command, verifying at least a first state of the first primary volume and the second primary volume, by the primary storage controller device, to determine whether at least the first state permits flash-copying of the first primary volume to the second primary volume. The method includes, in response to successfully verifying at least the first state, sending a first query from the primary storage controller device to a secondary host system. The first query requests whether a first secondary volume can be flash-copied to a second secondary volume. The first secondary volume asynchronously mirrors the first primary volume, and the second secondary volume asynchronously mirrors the second primary volume.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, asynchronous mirroring permits the secondary storage volume to be located at a significant distance away from the primary storage volume without incurring a performance penalty while updating the primary storage volume. Asynchronous mirroring can also be referred to as extended remote copying. Furthermore, another data backup technique is flash-copying, which is also referred to as point-in-time copying, snapshot copying, or shadow copying. In flash-copying, a source storage volume is copied to a target storage volume instantaneously or nearly instantaneously. Flash-copying particularly permits for completion of copying of a source storage volume to a target storage volume to be signaled prior to data on the source storage volume having been physically copied to the target storage volume. It is noted that the terminology "volume" is used synonymously herein as shorthand for the terminology "storage volume."

More specifically, flash-copying is a backup technique that makes it possible to create, nearly instantaneously point-in-time copies of storage volumes. When a source target volume is copied to a target storage volume using this technique, the copy of the target storage volume on the target storage volume is available immediately for read-and-write access. The time and input/output (I/O) needed to create such a snapshot of a storage volume usually does not increase with the size of the data set.

Flash copying may be desired to be performed in the context of an asynchronous mirroring environment. For instance, a first primary volume may be asynchronously mirrored to a first secondary volume located a significant distance away from the primary volume, for data protection purposes. A large number of write or update operations may be desired to be performed in an atomic batch manner at the first primary volume, such that either all the operations succeed, or none of the operations succeed. Therefore, the first primary volume may be flash-copied to a second primary volume that is more local to the first primary volume than the first secondary volume is. There is also a second secondary volume that is more local to the first secondary volume than the first primary volume is.

The second primary volume is further being asynchronously mirrored to the second secondary volume. As such, flash-copying of the first primary volume to the second primary volume means that the first secondary volume also has to be flash-copied, to the second secondary volume. However, presently flash-copying in such an asynchronous mirroring environment cannot be achieved.

By comparison, embodiments of the invention permit flash-copying to be performed within an asynchronous mirroring environment. The asynchronous mirroring environment can be the mirroring environment provided by technology known as z/OS® Global Mirror available from International Business Machines Corp. ("IBM"), of Armonk, N.Y., where z/OS® is a registered trademark of IBM. Other asynchronous mirroring environments in conjunction with which embodiments of the invention may be implemented can include that provided by the technology known as True-Copy®, available from Hitachi Data Systems Corp., of Santa Clara, Calif. Still other asynchronous mirroring environments in conjunction with which embodiments of the invention may be implemented can include that provided by the technology known as MirrorView™, available from EMC Corp., of Hopkinton, Mass. In general, such asynchronous mirroring environments in conjunction with which embodiments of the invention may be implemented may include any such environments, and which may also be referred to as asynchronous peer-to-peer remote copy (PPRC) technologies or solutions.

A primary host system sends a command to a primary storage controller to specify that a first primary volume is to be flash-copied to a second primary volume. The primary storage controller verifies at least the state of the first and second primary volumes, to determine whether at least their state permits flash-copying to occur. If so, then the primary storage controller sends a query to a secondary host system to request whether a first secondary volume can be flash-copied to a second secondary volume.

In turn, the secondary host system verifies at least the configuration of the first and second secondary volumes, to determine whether at least their configuration permits flash-coping to occur. If so, the secondary host system sends a query to a secondary storage controller, to determine whether a state of the first and second secondary storage controller permits flash-copying to occur. If the secondary storage controller successfully verifies this state, it responds back to the secondary host system that flash-copying can occur. The secondary host system then responds back to the primary storage controller that flash-copying can occur. The primary storage controller can therefore begin flash-copying the first primary volume to the second primary volume, with the knowledge that the first secondary volume will at some point later in time be successfully flash-copied to the second secondary volume.

As such, embodiments of the invention provide for a manner by which the primary storage controller can determine whether flash-copying between the first and second secondary volumes can occur, which in turn dictates whether the primary storage controller should flash-copy the first primary volume to the second primary volume. The primary storage controller may be unaware of and unable to communicate with the secondary storage controller. As such, the primary storage controller instead sends a query to the secondary host system, which in turn sends a query to the secondary storage controller. If the verifications performed by the primary storage controller, the secondary host system, and the secondary storage controller are all successful, then flash-copying can commence between the first and second primary volumes, and subsequently between the first and second secondary volumes.

Figure 1:
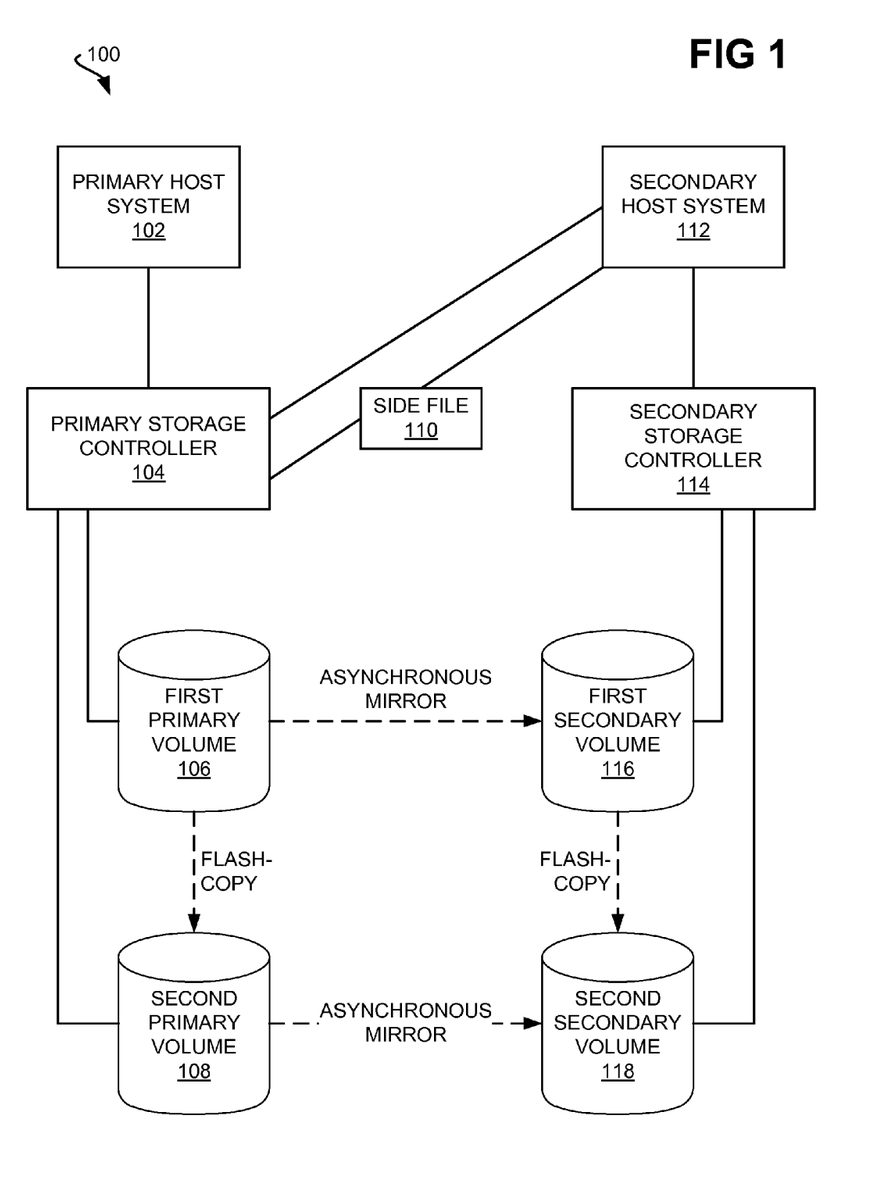
FIG. 1 is a diagram of a system in which asynchronous mirroring and flash-copying occur, according to an embodiment of the invention.

FIG. 1 shows a system 100, according to an embodiment of the invention. A solid line between two components in FIG. 1 indicates that the components can directly communicate with one another, such as over a network or a direct cable connection, without having to pass communication through any other component depicted in FIG. 1. By comparison, a dashed line between one component and another component in FIG. 1 indicates an operation performed in relation to the latter component with reference to the former component.

The system 100 includes a primary host system 102, a primary storage controller 104, a first primary volume 106, and a second primary volume 108. The host system 102, the controller 104, and the volumes 106 and 108 may be located in a local manner in relation to one another. For instance, all these components may be located in the same room, or the same building.

The system 100 also includes a secondary host system 112, a secondary storage controller 114, a first secondary volume 116, and a second secondary volume 118. The host system 112, the controller 114, and the volumes 116 and 118 also may be located in a local manner in relation to one another. However, the host system 112, the controller 114, and the volumes 116 and 118 may be located remote to the host system 102, the controller 104, and the volumes 106 and 108. For instance, the former components may be located in a different building, a different city, a different state, or even in a different country than the latter components.

The terminology "primary" and "secondary" is used herein mainly to distinguish the components on the left-hand side of FIG. 1 from the components on the right-hand side of FIG. 1. The secondary components on the right-hand side of FIG. 1 may also be considered as subordinate to the primary components on the left-hand side of FIG. 1. Furthermore, the primary storage controller 104 and the secondary storage controller 114 may also be referred to as a primary storage controller device and a secondary storage controller device, respectively.

The primary host system 102 may include one or more computing devices, like server computer devices, which process information by writing data to, updating data on, and reading data from the first primary volume 106. In this respect, the primary host system 102 interacts with the primary storage controller 104. The primary storage controller 104 in turn directly interacts with the primary volumes 106 and 108.

The primary volumes 106 and 108 may be logical storage volumes on the same or different storage devices, such as hard disk drives, arrays of hard disk drives, and so on. The first primary volume 106 may periodically be flash-copied to the second primary volume 108, as indicated by a dashed line in FIG. 1. That is, as desired, a point-in-time copy of the first primary volume 106 may be made to the second primary volume 108.

The primary storage controller 104 directly interacts with the secondary host system 112 in at least two different ways. First, the primary storage controller 104 may store data in a side file 110, which is then retrieved by the secondary host system 112. The side file 110 is a logical data file that is stored on a volume of a storage device, in the cache of the primary storage controller 104, and/or on a non-volatile storage device, among other places. Second, the primary storage controller 104 may directly communicate with the secondary host system 112 without using the side file 110, which is indicated in FIG. 1 by the solid line connecting the controller 104 and the host system 112.

The secondary host system 112 may also include one or more computing devices. The secondary host system 112 is responsible for at least in part managing an asynchronous mirroring relationship between the first primary volume 106 and the first secondary volume 116, as indicated by a dashed line in FIG. 1. That is, the first primary volume 106 is asynchronously mirrored to the first secondary volume 116.

For instance, when the primary host system 102 performs a write or update operation, the host system 102 sends the operation to the primary storage controller 104. The primary storage controller 104 performs the operation in relation to the first primary volume 106, and stores the operation in the side file 110. The primary storage controller 104 signals back to the primary host system 102 that the operation has been completed. At some point later in time, the secondary host system 112 retrieves the operation from the side file 110, and interacts with the secondary storage controller 114 to cause the operation to be performed in relation to the first secondary volume 116. As such, the current contents of the first secondary volume 116 mirror the past contents of the first primary volume 106.

Thus, like the primary host system 102, the primary storage controller 104, and the primary volumes 106 and 108, the secondary host system 112 interacts with the secondary storage controller 104, which in turn directly interacts with the secondary volumes 116 and 118. Like the primary volumes 106 and 108, the secondary volumes 116 and 118 may be logical storage volumes on the same or different storage devices. The storage devices implementing the secondary volumes 116 and 118 may be hard disk drives, arrays of hard disk drives, and so on, and are different than the storage devices implementing the primary volumes 106 and 108.

The first secondary volume 116 may periodically be flash-copied to the second secondary volume 118, as indicated by a dashed line in FIG. 1. For instance, it is first determined that the configuration and state of the volumes 106, 108, and 116, and 118 permit flash-copying of the first primary volume 106 to the second primary volume 108 and flash-copying of the first secondary volume 116 to the second secondary volume 118, as is described in detail below. Thereafter, the primary storage controller 104 initiates flash-copying from the first primary volume 106 to the second primary volume 108, reports back to the primary host system 102 that flash-copying has succeeding, and writes a flash-copy operation to the side file 110.

The secondary host system 112 reads the flash-copy operation at some later point in time, and instructs the secondary storage controller 114 to flash-copy the first secondary volume 116 to the second secondary volume 118. The secondary storage controller 114 then initiates flash-copying from the first secondary volume 116 to the second secondary volume 118. Once flash-copying has been completed, the contents of the second secondary volume 118 mirror the past contents of the second primary volume 108.

There are thus four logical operations indicated by dashed lines in FIG. 1. First, the first primary volume 106 is asynchronously mirrored to the first secondary volume 116. Second, the second primary volume 108 is asynchronously mirrored to the second secondary volume 118. Third, the first primary volume 106 is flash-copied to the second primary volume 108. Fourth, the second primary volume 108 is flash-copied to the second secondary volume 118.

As noted above, flash-copying of the first primary volume 106 to the second primary volume 108 should be performed only if the asynchronous mirroring relationship between the second primary volume 108 and the second secondary volume 118 can be properly maintained. That is, the state and configuration of the secondary volumes 116 and 118 have to be verified to ensure that the first secondary volume 116 can be flash-copied to the second secondary volume 118. Otherwise, if the first primary volume 106 is still flash-copied to the second primary volume 108, the second secondary volume 118 will no longer asynchronously mirror the second primary volume 108.

Furthermore, flash-copying of the first primary volume 106 to the second primary volume 108 should be performed only if the configuration and state of the primary volumes 106 and 108 permit such flash-copying. Therefore, if the configuration or state of the primary volumes 106 and 108 does not permit flash-copying, or if the configuration or state of the secondary volumes 116 and 118 does not permit flash-copying, then flash-copying should not be performed. Embodiments of the invention are thus directed to verifying these configurations and states, even in light of the architecture of FIG. 1, in which the primary storage controller 104 is unaware of the configuration and state of the secondary volumes 116 and 118. Embodiments of the invention are further directed to verifying these configurations and states, even in light of the architecture of FIG. 1, in which the primary storage controller 104 is also unaware of and cannot directly communicate with the secondary storage controller 114 to learn the configuration and state of the secondary volumes 116 and 118.

Figure 2A:
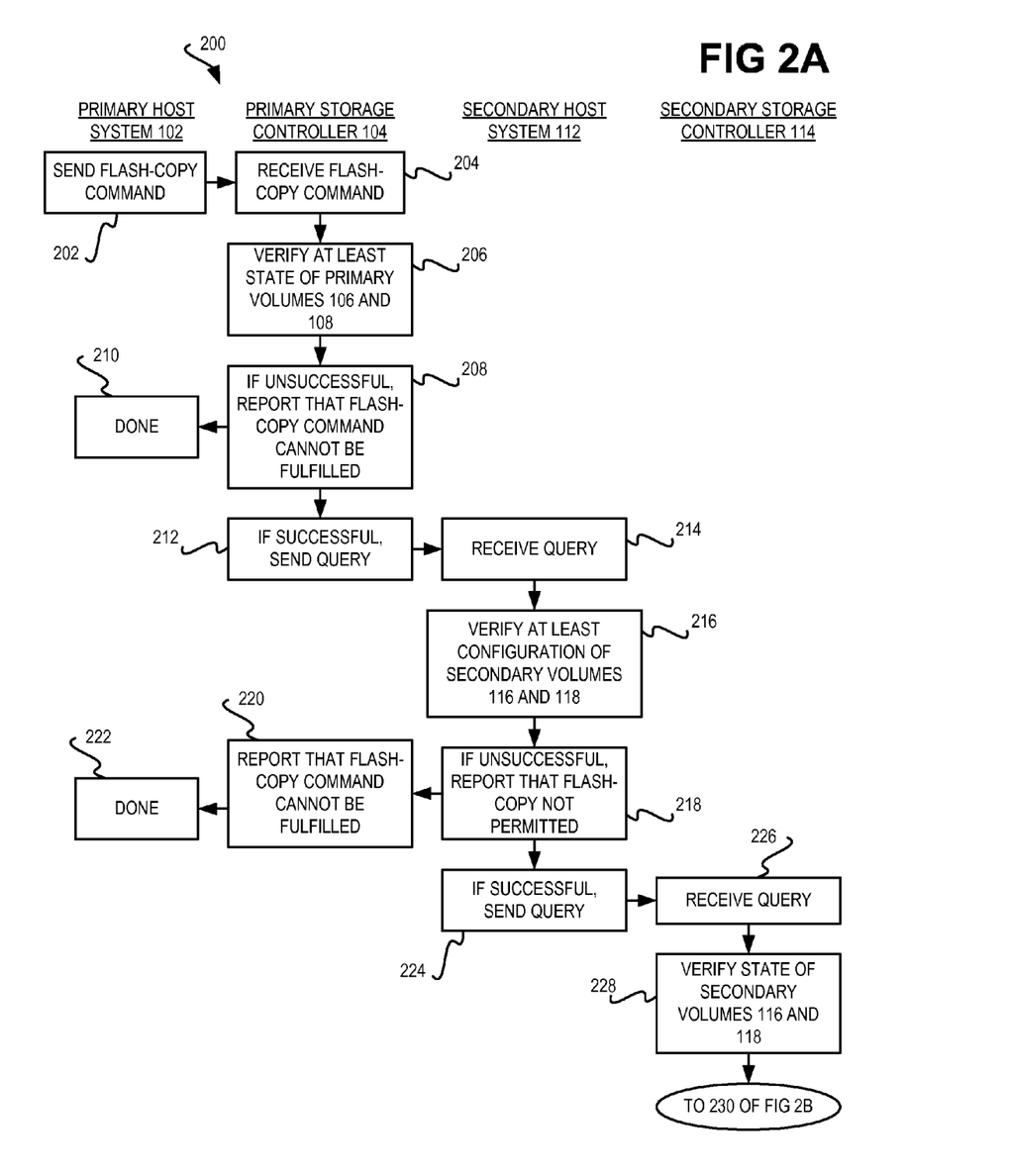
FIGS. 2A, 2B, and 2C are flowcharts of a method for performing flash-copying in relation to the system of FIG. 1 in which asynchronous mirroring also occurs, according to an embodiment of the invention.
Figure 2B:
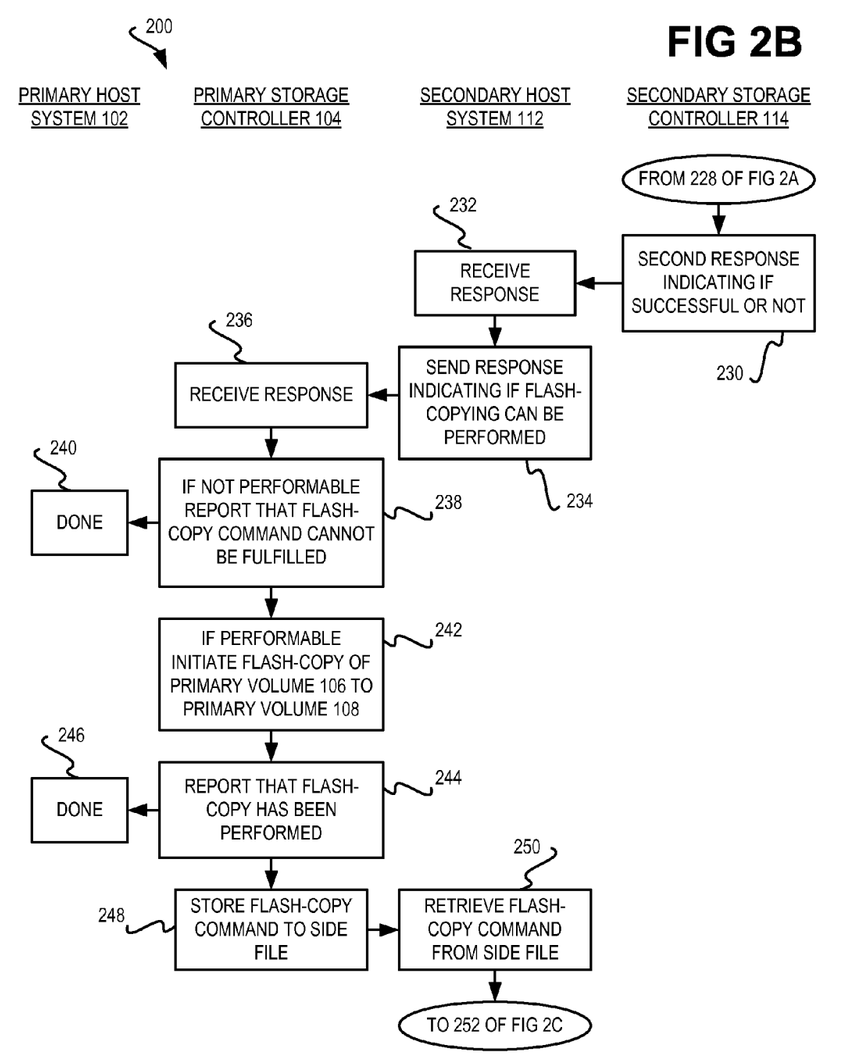
Figure 2C:
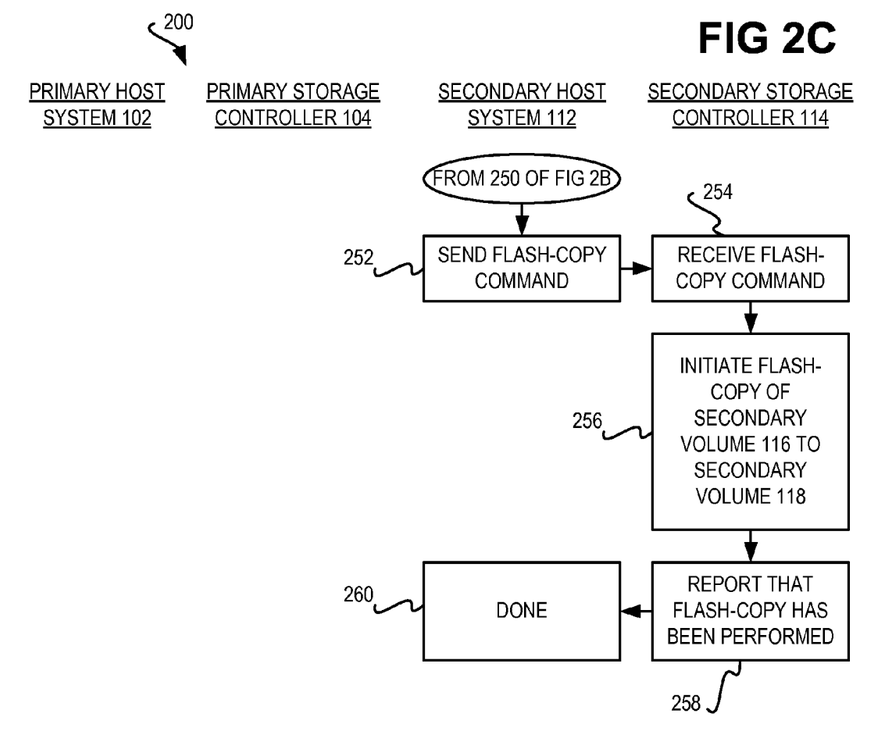

FIGS. 2A, 2B, and 2C show a method 200 for performing flash-copying within the asynchronous mirroring environment of the system 100 of FIG. 1, according to an embodiment of the invention. FIGS. 2A, 2B, and 2C are divided over four columns. Parts of the method 200 in the left-most column are performed by the primary host system 102. Parts of the method 200 in the second left-most column are performed by the primary storage controller 104. Parts of the method 200 in the second right-most column are performed by the secondary host system 112. Parts of the method 200 in the right-most column are performed by the secondary storage controller 114.

The primary host system 102 sends a flash-copy command to the primary storage controller 104 (202), which receives the command (204). The flash-copy command specifies that the first primary volume 106 is to be flash-copied to the second primary volume 108. As noted above, flash-copying provides for completion of copying the first primary volume 106 to the second primary volume 108 to be signaled by the primary storage controller 104 to the primary host system 102, prior to data on the first primary volume 106 being physically copied to the second primary volume 108.

In response to receiving the flash-copy command, the primary storage controller 104 verifies at least the state of the primary volumes 106 and 108 (206), to determine whether at least their state permits flash-copying of the first primary volume 106 to the second primary volume 108. The primary storage controller 104 may also verify the configuration of the primary volumes 106 and 108 to determine whether their configuration permits flash-copying of the first primary volume 106 to the second primary volume 108. Alternatively, the primary host system 102 may have verified the configuration of the primary volumes 106 and 108 before sending the flash-copy command to the primary storage controller 104.

The configuration of the primary volumes 106 and 108 is at least relatively static, involving how the primary volumes 106 and 108 are architecturally connected within the system 100. By comparison, the state of the primary volumes 106 and 108 is at least relatively dynamic, involving the current condition of the primary volumes 106 and 108. If the configuration of the primary volumes 106 and 108 permit flash-copying, the state of the primary volumes 106 and 108 may still not permit flash-copying. By comparison, if the configuration of the primary volumes 106 and 108 do not permit flash-copying, then the state of the primary volumes 106 and 108 does not matter. As such, both the configuration and the state of the primary volumes 106 and 108 have to permit flash-copying for flash-copying from the first primary volume 106 to the second primary volume 108 to occur.

The configuration verification can include determining that the primary volumes 106 and 108 are both in an asynchronous mirroring session. The configuration verification can also include determining that the primary volumes 106 and 108 are controlled by the same primary storage controller 104.

Other configuration verifications include determining that the primary storage controller 104 and the secondary storage controller 104 include software that support flash-copying.

The state verification can include determine that the primary volumes 106 and 108 are both active volumes within an asynchronous mirroring session. The state verification can also include determining that the primary volumes 106 and 108 are not presently participating in any other flash-copy relationships that would conflict with flash-copying the first primary volume 106 to the second primary volume 108.

If the verification is unsuccessful, then the primary storage controller 104 sends a response to the primary host system 102 indicating that the flash-copy command cannot be fulfilled (208). The primary host system 102 receives this response (210). As such, the method 200 is finished.

By comparison, if the verification is successful, then the primary storage controller 104 responsively sends a query to the secondary host system 112 (212), which receives the query (214). The query requests that the secondary host system 112 indicate whether the first secondary volume 116 can be flash-copied to the second secondary volume 118. The query can include a token that at last substantially uniquely identifies the query, so that the query can be differentiated from other queries that the primary storage controller 104 may send or may have sent to the secondary host system 112.

In response to receiving the query, the secondary host system 112 verifies at least the configuration of the secondary volumes 116 and 118 (216), to determine whether at least their configuration permit the first secondary volume 116 to be flash-copied to the second secondary volume 118. The configuration that is verified in relation to the secondary volumes 116 and 118 may correspond to the configuration that has been at least implicitly verified in relation to the primary volumes 106 and 108, as described above. For instance, the configuration verification can include determining that the secondary volumes 116 and 118 are controlled by the same secondary storage controller 114. The configuration verification can also include determining that the pair of volumes 106 and 116 and the pair of volumes 108 and 118 are each within an asynchronous mirroring session.

The secondary host system 112 may also verify the state of the secondary volumes 116 and 118 in part 216. For instance, the state verification can include determining that the first secondary volume 116 is in duplex status with the first primary volume 106, and that the second secondary volume 118 is in duplex status with the second primary volume 108. Duplex status between a secondary volume and a primary volume means that the secondary volume in question is currently and properly asynchronously mirroring the primary volume in question.

If the verification is unsuccessful, then the secondary host system 112 sends a response to the primary storage controller 104 indicating that the first secondary volume 116 cannot be flash-copied to the second secondary volume 118 (218). The primary storage controller receives this response, and in turn sends a response to the primary host system 102 that the flash-copy command cannot be fulfilled (220). The primary host system 102 receives this response, ending the method 200 (222).

If the verification is successful, then the secondary host system 112 sends a query to the secondary storage controller 114 (224), which receives the query (226). The query requests that the secondary storage controller 14 indicate whether the first secondary volume 116 can be flash-copied to the second secondary volume 118. The query can also include a token that least substantially uniquely identifies the query, so that the query can be differentiated from other queries that the secondary host system 112 may send or may have sent to the secondary storage controller 114.

In response to receiving the query, the secondary storage controller 114 verifies the state of the secondary volumes 116 and 118 (228), to determine whether their state permit the first secondary volume 116 to be flash-copied to the second secondary volume 118. If the secondary host system 112 had verified the state of the secondary volumes 116 and 118 in part 216, then the secondary storage controller 114 verifies different state information than the secondary host system 112 verified. That is, the secondary storage controller 114 can verify one part of the state of the secondary volumes 116 and 118, and the secondary host system 112 can verify a different part of this state.

The state of the secondary volumes 116 and 118 that is verified by the secondary storage controller 114 may correspond to the state of the primary volumes 106 and 108 that the primary storage controller 104 verified in part 206. For instance, the state information can include determining that the secondary volumes 116 and 118 are both active volumes within an asynchronous mirroring session. As another example, the state verification can include determining that the secondary volumes 116 and 118 are not presently participating in any other flash-copy relationships that would conflict with flash-copying the first secondary volume 116 to the second secondary volume 118.

The secondary storage controller 114 sends a response to the secondary host system 112 indicating whether the verification was successful or not (230), and the secondary host system 112 receives the response (232). The secondary host system 112 then sends a response to the primary storage controller 104 indicating whether or not flash-copying from the first secondary volume 116 to the second secondary volume 118 can be performed (234), and the primary storage controller 104 receives the response (236). If flash-copying from the first secondary volume 116 to the second secondary volume 118 cannot be performed, then the primary storage controller 104 sends a response to the primary host system 102 indicating that the command to flash-copy the first primary volume 106 to the second primary volume 108 cannot be fulfilled (238). The primary host system 102 receives this response, ending the method 200 (240).

As such, it can be said that when the secondary storage controller 114 unsuccessfully verifies the state of the secondary volumes 116 and 118, the secondary storage controller 114 sends a response to the secondary host system 112 indicating that the state of the secondary volumes 116 and 118 does not permit flash-copying of the first secondary volume 116 to the second secondary volume 118. It can likewise be said that the secondary host system 112 then responsively sends a response to the primary storage controller 104 indicating that the first secondary volume 116 cannot be copied to the second secondary volume 118. It can also be said that the primary storage controller 104 then responsively sends a response to the primary host system 102, indicating that the command specifying that the first primary volume 106 is to be flash-copied to the second primary volume 108 cannot be fulfilled.

By comparison, if flash-copying from the first secondary volume 116 to the second secondary volume 118 can be performed, then the primary storage controller 104 initiates flash-copying of the first primary volume 106 to the second primary volume 108 (242). Even before the data of the first primary volume 106 has been copied to the second primary volume 108, the primary storage controller 104 sends a response to the primary host system 102 that the flash-copy command has been fulfilled—that is, that the first primary volume 106 has been successfully flash-copied to the second primary volume 108 (244). The primary host system 102 receives this response, ending the method 200 (246).

As such, it can be said that when the secondary storage controller 114 successfully verifies the state of the secondary volumes 116 and 118, the secondary storage controller 114 sends a response to the secondary host system 112 indicating that the state of the secondary volumes 116 and 118 permits flash-copying of the first secondary volume 116 to the second secondary volume 118. It can likewise be said that the secondary host system 112 then responsively sends a response to the primary storage controller 104 indicating that the first secondary volume 116 can be copied to the second secondary volume 118. It can also be said that the primary storage controller 104 then responsively initiates flash-copying of the first primary volume 106 to the second primary volume 108.

The primary storage controller 104 also stores, or writes, a flash-copy command to the side file 110 (248). Storing the flash-copy command to the side file 110 can in one embodiment be considered as part of initiating the flash-copy operation in part 242. The secondary host system 112 at some point in time after the flash-copy command has been written to the side file 110 retrieves, or reads, the flash-copy command from the side file 110 (250).

After reading the flash-copy command, the secondary host system 112 sends a flash-copy command to the secondary storage controller 114 (252), which receives the flash-copy command (254). The command specifies that the first secondary volume 116 is to be flash-copied to the second secondary volume 118. In response to receiving the flash-copy command, the secondary storage controller 114 initiates flash-copying of the first secondary volume 116 to the second secondary volume 118 (256). The secondary storage controller 114 may then send a response back to the secondary host system 112 that the first secondary volume 116 has been flash-copied to the second secondary volume 118 (258). The secondary host system 112 receives this response, ending the method 200 (260).

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
sending a first command from a primary host system to a primary storage controller device, the first command specifying that a first primary volume is to be flash-copied to a second primary volume, where flash-copying provides for completion of copying the first primary volume to the second primary volume to be signaled prior to data on the first primary volume being physically copied to the second primary volume;
in response to receiving the first command, verifying at least a first state of the first primary volume and the second primary volume, by the primary storage controller device, to determine whether at least the first state permits flash-copying of the first primary volume to the second primary volume; and,
in response to successfully verifying at least the first state, sending a first query from the primary storage controller device to a secondary host system, the first query requesting whether a first secondary volume can be flash-copied to a second secondary volume, the first secondary volume asynchronously mirroring the first primary volume, and the second secondary volume asynchronously mirroring the second primary volume.

2. The method of claim 1, further comprising:
in response to receiving the first query, verifying at least a configuration of the first secondary volume and the second secondary volume, by the secondary host system, to determine whether at least the configuration permits flash-copying of the first secondary volume to the second secondary volume.

3. The method of claim 2, further comprising:
in response to successfully verifying at least the configuration, sending a second query from the secondary host system to a secondary storage controller device, the second query requesting whether the first secondary volume can be flash-copied to the second secondary volume; and,
in response to receiving the second query, verifying a second state of the first secondary volume and the second secondary volume, by the secondary storage controller device, to determine whether the second state permits flash-copying of the first secondary volume to the second secondary volume.

4. The method of claim 3, further comprising:
in response to successfully verifying the second state, sending a first response from the secondary storage controller device to the secondary host system, the first response indicating that the second state permits flash-copying of the first secondary volume to the second secondary volume; and,
in response to receiving the first response, sending a second response from the secondary host system to the primary storage controller device, the second response indicating that the first secondary volume can be flash-copied to the second secondary volume.

5. The method of claim 4, further comprising:
in response to receiving the second response, initiating flash-copying of the first primary volume to the second primary volume, by the primary storage controller device; and,
sending a third response from the primary storage controller device to the primary host system, the third response indicating the first primary volume has been successfully flash-copied to the second primary volume.

6. The method of claim 5, wherein initiating flash-copying of the first primary volume to the second primary volume comprises writing a flash-copy command to a side file, by the primary storage controller device,
and wherein the method further comprises:
reading the flash-copy command from the side file by the secondary host system;
after reading the flash-copy command from the side file, sending a second command from the secondary host system to the secondary storage controller device, the second command specifying that the first secondary volume is to be flash-copied to the second secondary volume; and,
in response to receiving the second command, initiating flash-copying of the first secondary volume to the second secondary volume, by the secondary storage controller device.

7. The method of claim 3, further comprising:
in response to unsuccessfully verifying the second state, sending a first response from the secondary storage controller device to the secondary host system, the first response indicating that the second state does not permit flash-copying of the first secondary volume to the second secondary volume;
in response to receiving the first response, sending a second response from the secondary host system to the primary storage controller device, the second response indicating that the first secondary volume cannot be flash-copied to the second secondary volume; and, in response to receiving the second response, sending a third response from the primary storage controller device to the primary host system, the third response indicating that the first command specifying that the first primary volume is to be flash-copied to the second primary volume cannot be fulfilled.

8. The method of claim 3, wherein the primary storage controller device is unaware of and cannot directly communicate with the secondary storage controller device.

9. The method of claim 2, further comprising:

in response to unsuccessfully verifying at least the configuration, sending a first response from the secondary host system to the primary storage controller device, the first response indicating that the first secondary volume cannot be flash-copied to the second secondary volume; and, in response to receiving the first response, sending a second response from the primary storage controller device to the primary host system, the second response indicating that the first command specifying that the first primary volume is to be flash-copied to the second primary volume cannot be fulfilled.

10. The method of claim 1, in response to unsuccessfully verifying at least the first state, sending a response from the primary storage controller device to the primary host system, the response indicating that the first command specifying that the first primary volume is to be flash-copied to the second primary volume cannot be fulfilled.

* * * * *